(12) United States Patent
Alameh et al.

(10) Patent No.: US 9,261,991 B2
(45) Date of Patent: *Feb. 16, 2016

(54) MULTI-LAYERED SENSING WITH MULTIPLE RESOLUTIONS

(71) Applicant: Google Technology Holdings LLC, Mountain View, CA (US)

(72) Inventors: Rachid M. Alameh, Crystal Lake, IL (US); Robert T. Love, Barrington, IL (US); Jiri Slaby, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/928,498

(22) Filed: Jun. 27, 2013

(65) Prior Publication Data

US 2014/0359756 A1    Dec. 4, 2014

Related U.S. Application Data

(60) Provisional application No. 61/827,929, filed on May 28, 2013.

(51) Int. Cl.
  *G06F 9/00* (2006.01)
  *G06F 3/041* (2006.01)
  (Continued)

(52) U.S. Cl.
  CPC .............. *G06F 3/041* (2013.01); *G06F 3/0416* (2013.01); *G06F 3/04886* (2013.01); *G06F 21/32* (2013.01)

(58) Field of Classification Search
  CPC ....... G06F 21/32; G06F 3/041; G06F 3/0416; G06F 3/04886

USPC .......................................................... 726/19
See application file for complete search history.

(56) References Cited

U.S. PATENT DOCUMENTS 6,222,528 B1    4/2001  Gerpheide et al.
8,094,173 B2 *  1/2012  Lee .............................. 345/698
(Continued)

FOREIGN PATENT DOCUMENTS

WO        9840962 A1    9/1998
WO     2012054350 A1    4/2012
WO     2012090805 A1    7/2012

OTHER PUBLICATIONS

International Search Report and Written Opinion of the International Search Authority dated Nov. 6, 2014 in International Patent Application No. PCT/US2014/039504.
(Continued)

*Primary Examiner* — Ashok Patel
*Assistant Examiner* — Gary Gracia
(74) *Attorney, Agent, or Firm* — Shumaker & Sieffert, P.A.

(57) ABSTRACT

A display component (108) displays multiple icons that a user can touch. A multi-layered sensing component (104) includes at least a high resolution sensing component (204) and a low resolution sensing component (202). The low resolution sensing component is activated to detect objects touching the multi-layer sensing component. In response to the low resolution sensing component detecting an object touching one of the multiple icons, the low resolution sensing component is deactivated and at least a portion of the high resolution sensing component over the touched icon is activated. The high resolution sensing component senses the user's fingerprint, which is authenticated. After sensing the user's fingerprint, the high resolution sensing component is deactivated and the low resolution sensing component is reactivated.

19 Claims, 9 Drawing Sheets

(51) Int. Cl.
*G06F 21/32* (2013.01)
*G06F 3/0488* (2013.01)
*G06F 15/16* (2006.01)

(56) References Cited

U.S. PATENT DOCUMENTS

| | | | |
|---|---|---|---|
| 8,866,791 B2 * | 10/2014 | Barnhoefer | G06F 1/3203 345/156 |
| 2002/0005837 A1 * | 1/2002 | Thomason et al. | 345/169 |
| 2007/0076923 A1 * | 4/2007 | Chiu | 382/124 |
| 2007/0092118 A1 * | 4/2007 | Tachibana | A63F 13/10 382/125 |
| 2008/0309631 A1 | 12/2008 | Westerman et al. | |
| 2009/0033522 A1 * | 2/2009 | Skillman et al. | 341/23 |
| 2009/0138725 A1 * | 5/2009 | Madhvanath | G07C 9/00158 713/186 |
| 2009/0201246 A1 | 8/2009 | Lee et al. | |
| 2009/0221272 A1 * | 9/2009 | Fyke | G06F 1/1626 455/414.1 |
| 2009/0251436 A1 * | 10/2009 | Keskin | 345/174 |
| 2009/0309851 A1 | 12/2009 | Bernstein | |
| 2010/0007613 A1 * | 1/2010 | Costa | 345/173 |
| 2010/0044121 A1 * | 2/2010 | Simon | G06F 3/03547 178/18.03 |
| 2010/0053116 A1 * | 3/2010 | Daverman et al. | 345/175 |
| 2010/0134447 A1 * | 6/2010 | Nakajoh | 345/175 |
| 2010/0156805 A1 * | 6/2010 | Brand et al. | 345/173 |
| 2010/0253619 A1 | 10/2010 | Ahn | |
| 2011/0025619 A1 | 2/2011 | Joguet et al. | |
| 2011/0163966 A1 * | 7/2011 | Chaudhri | 345/173 |
| 2011/0163976 A1 * | 7/2011 | Barnhoefer | G06F 1/3203 345/173 |
| 2011/0169760 A1 | 7/2011 | Largillier | |
| 2012/0090757 A1 | 4/2012 | Buchan et al. | |
| 2012/0176343 A1 | 7/2012 | Holmgren | |
| 2012/0182253 A1 * | 7/2012 | Brosnan | 345/174 |
| 2012/0262416 A1 * | 10/2012 | Kitamura | 345/174 |
| 2012/0274583 A1 * | 11/2012 | Haggerty | 345/173 |
| 2013/0135218 A1 * | 5/2013 | Jain et al. | 345/173 |
| 2013/0285966 A1 | 10/2013 | Kimura et al. | |
| 2013/0287274 A1 * | 10/2013 | Shi | G06K 9/0002 382/124 |
| 2014/0270413 A1 * | 9/2014 | Slaby et al. | 382/124 |
| 2014/0270415 A1 * | 9/2014 | Alameh | G06K 9/00026 382/124 |
| 2014/0354556 A1 | 12/2014 | Alameh et al. | |

OTHER PUBLICATIONS

Prosecution History from U.S. Appl. No. 13/928,470 from Nov. 10, 2014 to May 1, 2015 33 pp.

Notice of Allowance from U.S. Appl. No. 13/928,470, mailed Sep. 17, 2015.

* cited by examiner

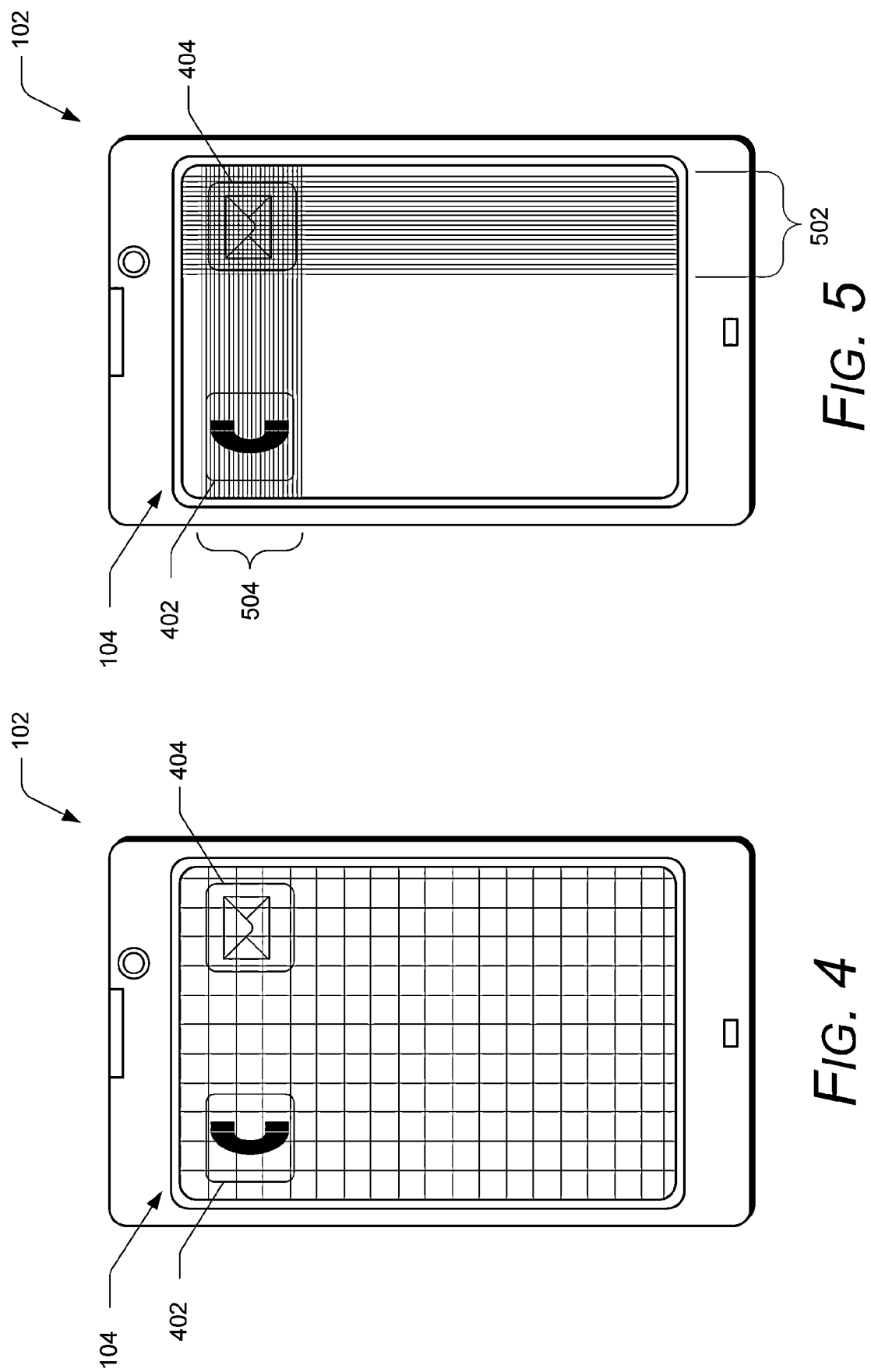

MULTI-LAYERED SENSING WITH MULTIPLE RESOLUTIONS

CROSS REFERENCE TO RELATED APPLICATIONS

This application claims priority to U.S. provisional patent application No. 61/827,929 filed on May 28, 2013, entitled ITO Enabled Authentication, which is incorporated by reference herein in its entirety.

This application is related to co-owned U.S. patent application Ser. No. 13/928,470, entitled Adaptive Sensing Component Resolution Based On Touch Location, and filed concurrently herewith.

BACKGROUND

As computing technology has advanced, computing devices such as smart phones, tablet computers, desktop computers, and so forth have become increasingly commonplace. Users often times desire to restrict access to their devices, whether because they don't want others to use the functionality that the devices provide, because they store data on their devices that they desire to keep secret, or some other reason. To restrict access, devices typically have an authentication step that must be passed by the user before they can access one of their devices, such as entry of a password or personal identification number (PIN) on a log-in screen, or capturing of a fingerprint by a dedicated fingerprint sensor. Such authentication steps, however, can be time consuming and detract from the usability of the devices, leading to frustrating user experiences.

BRIEF DESCRIPTION OF THE DRAWINGS

Embodiments of multi-layered sensing with multiple resolutions are described with reference to the following drawings. The same numbers are used throughout the drawings to reference like features and components:

FIGS. 4, 5, and 6 illustrate examples of devices implementing the multi-layered sensing with multiple resolutions in accordance with one or more embodiments;

DETAILED DESCRIPTION

Multi-layered sensing with multiple resolutions is discussed herein. Multiple icons are displayed and can be selected by being touched by an object, such as a user's finger. A multi-layered sensing component includes at least a high resolution sensing component and a low resolution sensing component. The low resolution sensing component is activated to detect objects touching the multi-layer sensing component. In response to the low resolution sensing component detecting an object touching one of the multiple icons, the low resolution sensing component is deactivated and at least a portion of the high resolution sensing component over the touched icon is activated. The high resolution sensing component senses the user's fingerprint, which is authenticated. After sensing the user's fingerprint, the high resolution sensing component is deactivated and the low resolution sensing component is reactivated.

Figure 1:
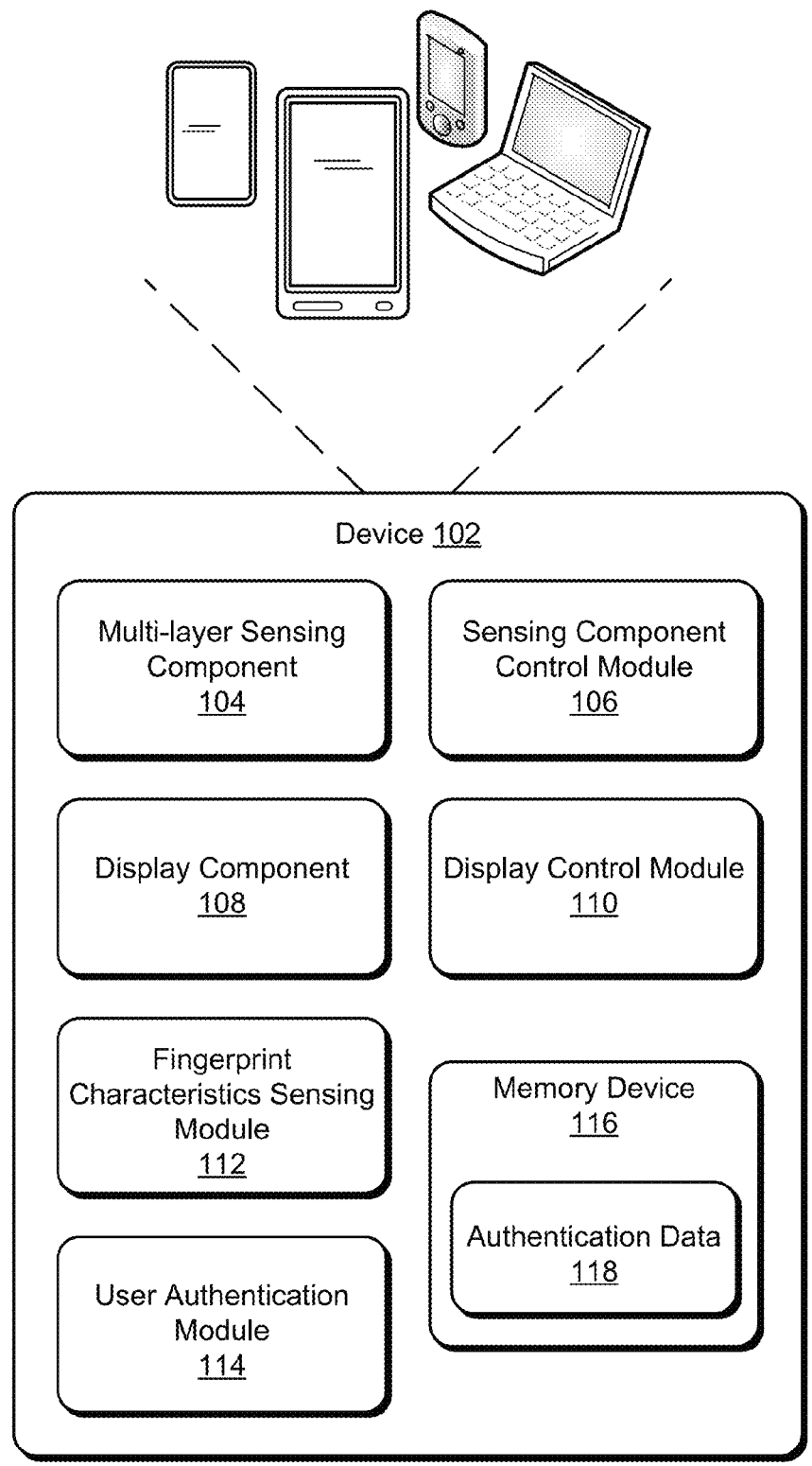
FIG. 1 illustrates an example device implementing the multi-layered sensing with multiple resolutions in accordance with one or more embodiments.

FIG. 1 illustrates an example device 102 implementing the multi-layered sensing with multiple resolutions in accordance with one or more embodiments. The device 102 includes a multi-layer sensing component 104, a sensing component control module 106, a display component 108, a display control module 110, a fingerprint characteristics sensing module 112, a user authentication module 114, and a memory device 116 with authentication data 118. The device 102 can be any of a variety of different types of devices, such as a laptop computer, a cellular or other wireless phone, a tablet computer, an entertainment device, an audio and/or video playback device, a server computer, and so forth.

Although illustrated as a single device 102, it should be noted that different modules of the device 102 can alternatively be implemented in different devices. For example, the multi-layer sensing component 104, the sensing component control module 106, the display component 108, and the display control module 110 can be implemented in one device, and the fingerprint characteristics sensing module 112, the user authentication module 114, and the memory device 116 can be implemented in another device. It should also be noted that the device 102 can include additional modules or components that provide additional functionality (e.g., a central processing unit (CPU), communication components, etc.), or alternatively such additional modules or components can be implemented in a separate device. For example, the device 102 may be implemented as a wearable device (e.g., a watch) that communicates with another device that implements the additional functionality.

The multi-layer sensing component 104 is a multi-layer component, the multiple layers including at least two layers that are sensing components each having different sensing component resolutions. Each layer of the multi-layer sensing component 104 can be implemented using any of a variety of different technologies and types of sensors, such as capacitive sensors, pressure sensors, optical sensors, thermal sensors, ultrasonic sensors, imaging sensors, and so forth. For example, each layer of the multi-layer sensing component 104 can be an indium tin oxide (ITO) sensor. The multi-layer sensing component 104 can optionally be part of a sensor structure that includes one or more layers providing various additional functionality, such as protection from scratches and abrasions, feedback regarding a user touching the multi-layer sensing component 104, and so forth. Different layers of the multi-layer sensing component 104 can be implemented using the same or different technologies.

Figure 2:
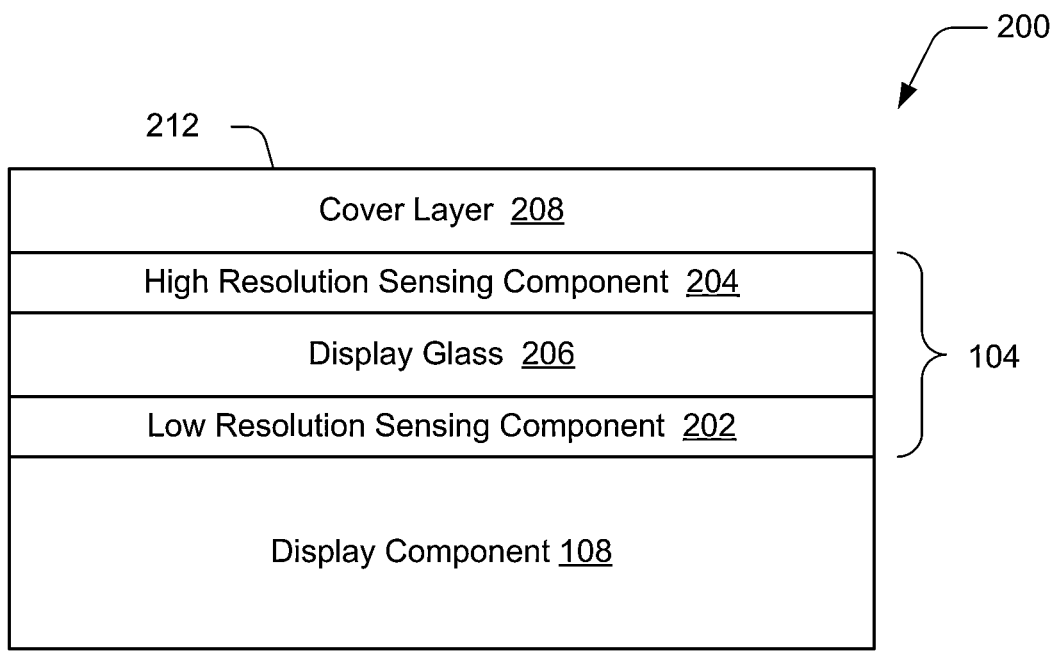
FIG. 2 illustrates a cross-section view of an example touch display structure in accordance with one or more embodiments.

The multi-layer sensing component 104 and the display component 108 together can implement a touch display structure. FIG. 2 illustrates a cross-section view of an example touch display structure 200 in accordance with one or more embodiments. The touch display structure 200 includes a multi-layer sensing component 104 having a low resolution sensing component 202 and a high resolution sensing component 204. The high resolution sensing component 204 and the low resolution sensing component 202 are each a layer of the multi-layer sensing component 104. Although the sensing component 104 includes the high resolution sensing component 204 and the low resolution sensing component 202, typically only one of the two components 202 and 204 is activated at any given time. The one of the components 202 and 204 that is activated is able to sense an object touching the touch display structure 200, whereas the one of the components 202 and 204 that is not activated (e.g., is inactive or is deactivated) is not able to sense an object touching the touch display structure 200.

The sensing components 202 and 204 are separated by an additional separation layer that is illustrated as display glass 206. However, it should be noted that the sensing components 202 and 204 can be separated by a layer made of any of a variety of different materials, such as various plastic materials, adhesive only, and so forth. Alternatively, depending on the manner in which the sensing components 202 and 204 are implemented, no layer need separate the sensing components 202 and 204, and the sensing components 202 and 204 can be adjacent to one another.

Situated on top of the multi-layer sensing component 104 is a cover layer 208, that can be made of any of a variety of protective materials, such as glass, plastic, or other protective coating. The cover layer 208 provides protection from scratches, abrasions, the environment, and so forth. Alternatively, depending on the manner in which the sensing component 204 is implemented, no protective layer on top of the multi-layer sensing component 104 need be used.

Reference is made herein to components or layers being above others. In the touch display structure 200, the high resolution sensing component 204 is referred to as being above or on top of the low resolution sensing component 202, and the low resolution sensing component 202 is referred to as being below or on bottom of the high resolution sensing component 204. A user can touch the top 212 of the cover layer 208 (the face of the cover glass opposite the face touching the high resolution sensing component 204). In one embodiment the high resolution sensing component 204 is situated closer to the top 212 (where a finger would touch the structure 200) than the low resolution sensing component 202.

The sensing components 202 and 204 have different resolutions. The resolution of a sensing component 202 or 204 indicates a number of dots or points per unit that can be sensed by the component. References to these dots or points per unit being dots per inch are made herein, although it should be noted that other units can alternatively be used (e.g., centimeters). In one or more embodiments, each sensing component 202 and 204 is a grid of lines (e.g., ITO lines) including multiple rows of lines and multiple columns of lines, some lines (e.g., rows, or alternatively columns) being drive lines and other lines (e.g., columns, or alternatively rows) being sense lines. A current is driven on the drive lines, and the sense lines sense an object touching the grid (e.g., touching the top of the sensing component, or the top 212 of the cover layer 208). The larger the number of drive and sense lines the greater the resolution that the sensing component can provide. The dots or points in such a grid are at each intersection of a column line and a row line.

The high resolution sensing component 204 is a sensing component having a larger number of dots per inch, such as on the order of a few hundred dots per inch. The high resolution sensing component 204 has sufficient resolution to sense an object touching the sensing component as well as detail regarding the object. The high resolution sensing component 204 can sense fingerprint data of a user's finger that is touching the sensing component 104 (e.g., touching the top 212 of the cover layer 208). The fingerprint data contains a fingerprint's pattern on each of the fingers, allowing the location of various minutiae or pattern(s) of the fingerprint and/or the outline or shape of the finger to be identified. The minutiae of the fingerprint refer to, for example, the ridge endings and bifurcations of the fingerprint. The minutiae of the fingerprint can optionally include additional details, such as the points at which scars begin, the points at which scars end, and so forth.

The low resolution sensing component 202 has a smaller number of dots per inch, such as on the order of tens of dots per inch. The low resolution sensing component has sufficient resolution to sense an object touching the sensing component, but very little (if any) detail regarding the object. For example, the low resolution sensing component 202 can sense a finger touching the sensing component, but cannot detect fingerprint minutiae or pattern(s). Although the low resolution sensing component 202 has a lower resolution than the high resolution sensing component 204, the low resolution sensing component 202 typically consumes less power than the high resolution sensing component 204.

Although two sensing components 202 and 204 are illustrated, alternatively the sensing component 104 can include one or more additional sensing components. For example, the multi-layer sensing component 104 may include a medium resolution sensing component (not shown) that has a smaller number of dots per inch than the high resolution sensing component 204 but a larger number of dots per inch than the low resolution sensing component 202.

In one embodiment, each of the high resolution sensing component 204 and the low resolution sensing component 202 has a fixed resolution. In this embodiment, the resolution of each sensing component 202 and 204 does not change during operation of the touch display structure 200. In other embodiments, one or both of the high resolution sensing component 204 and the low resolution sensing component 202 can operate at different resolutions, also referred to as operating in different resolution modes. For example, the high resolution sensing component 204 may be able to operate in a high resolution mode having a larger number of dots per inch (such as on the order of a few hundred dots per inch) and a medium resolution mode having a smaller number of dots per inch than the high resolution mode but a larger number of dots per inch than the low resolution sensing component 202 (such as on the order of a hundred or so dots per inch).

Additionally, different areas of one or both of the high resolution sensing component 204 and the low resolution sensing component 202 can be activated while other areas are deactivated. For example, one area of the high resolution sensing component 204 may be operating in a high resolution mode concurrently with another area of the high resolution sensing component 204 being deactivated. An area being deactivated refers to the area being unable to sense an object touching the area. The manner in which an area of a sensing component is deactivated can vary based on the manner in which the sensing component is implemented. For example, if the sensing component is a grid of drive lines and sense lines, an area can be deactivated by deactivating (not driving) current on the drive lines that pass through that area, and by not powering (deactivating) sensing circuitry to sense current on the sense lines that pass through that area.

Returning to FIG. 1, the sensing component control module 106 controls the multi-layer sensing component 104. The sensing component control module 106 determines which layers of the sensing component 104 are to be activated at which times, and for each layer which areas of the layer are to be activated at which times. The sensing component control module 106 can determine which layers are to be activated, and for a given layer which areas of the layer are to be activated in a variety of different manners as discussed in more detail below.

The display component 108 is a display screen or display device. The display component 108 allows a user interface (UI), content, other information, and so forth to be displayed to a user of the device 102. The display component 108 can be implemented together with the multi-layer sensing component 104 to form the touch display structure 200 of FIG. 2. In the illustrated example of FIG. 2, the multi-layer sensing component 104 is situated on top of the display component 108, with the UI, content, or other information displayed by the component 108 displaying and being visible to a user of the touch display structure 200 through the multi-layer sensing component 104. The high resolution sensing component 204 and the low resolution sensing component 202 can each sense objects touching the top of touch display structure 200 (e.g., touching the top 212 of the cover layer 208), allowing the user of the touch display structure 200 to interact with icons and other content or information displayed on the display component 108. Alternatively, at least one of the high resolution sensing component 204 and the low resolution sensing component 202 can be situated below the display component 108, in which case an object touching the top of the touch display structure 200 (e.g., touching the top 212 of the cover layer 208) is sensed by the sensing component 202 or 204 through the display component 108.

Returning to FIG. 1, the display control module 110 manages display of the UI, content, or other information on the display component 108. The UI includes various elements, referred to as icons, that are displayed to users and represent functionality of the device 102 (or another device that the device 102 is coupled to).

The fingerprint characteristics sensing module 112 receives the fingerprint data, also referred to as the sensed fingerprint data, that is sensed by the multi-layer sensing component 104. In one embodiment, this fingerprint data is an indication of the locations where different portions of the surface of the finger are sensed as protruding further than other portions, these protruding portions resulting in the fingerprint's pattern. The locations can be identified in various different manners, such as using a 2-dimensional Cartesian coordinate system in which the locations where protrusions are sensed are identified (e.g., a grid or matrix of values corresponding to sensor locations can be used, with one value (e.g., a value of 1) in the grid or matrix indicating a protrusion is sensed at the corresponding location, and another value (e.g., a value of 0) in the grid or matrix indicating a protrusion is not sensed at the corresponding location). Alternatively, other coordinate systems can be used, such as Polar coordinate systems, proprietary coordinate systems, and so forth.

The fingerprint characteristics sensing module 112 identifies, based on the sensed fingerprint data, various finger characteristics of one or more of the user's fingers sensed by the multi-layer sensing component 104. These finger characteristics can include, for example, the general shape of the fingers (e.g., the lengths and widths of the fingers relative to one another), the locations of boundaries between fingers, the locations of minutiae in a fingerprint relative to the locations of other minutiae in the same fingerprint, the locations of minutiae in a fingerprint relative to the locations of minutiae in one or more other fingerprints, and so forth.

Various data regarding the user's finger characteristics is stored in the memory device 116, which can be volatile and/or nonvolatile memory (e.g., RAM, Flash memory, magnetic disk, etc.), as authentication data 118. The authentication data 118 includes data indicating one or more correct or representative finger characteristic samples for a user. Finger characteristic samples can be stored as part of the authentication data 118 during an enrollment process, which refers to a process during which the user is setting up or initializing the device 102 to authenticate his or her fingerprint. Finger characteristic samples can also be stored at other times, such as in response to a user being authenticated using the techniques discussed herein. For example, each time the user is successfully authenticated, the finger characteristics sensed during that authentication process can be combined (e.g., averaged) with the previously stored authentication data.

The fingerprint characteristics sensing module 112 generates data identifying the finger characteristics and makes the generated data available to the user authentication module 114. The user authentication module 114 analyzes the finger characteristics identified by the module 112 and compares the identified characteristics to one or more stored finger characteristic samples maintained as part of the authentication data 118. Based on this comparison, the finger authentication module 114 determines whether the finger characteristics identified by the module 112 satisfy the authentication data 118. If the finger characteristics satisfy the authentication data (e.g., the finger characteristics match stored finger characteristics data), then the user authentication succeeds and the user is authenticated. However, if the finger characteristics do not satisfy the authentication data (e.g., the finger characteristics do not match stored finger characteristics data), then the user authentication fails and the user is not authenticated.

The user authentication module 114 can make this comparison in different manners in accordance with various different embodiments. In one embodiment, the authentication module 114 compares the finger characteristics identified by the sensing module 112 to the authentication data 118 and determines whether the identified finger characteristics match stored finger characteristics data for the user.

The authentication module 114 can determine whether two sets or samples of finger characteristics (e.g., finger characteristics identified by the sensing module 112 and finger characteristics stored as the authentication data 118) match in various different manners. In one embodiment, the finger characteristics (e.g., locations of minutiae, patterns, finger widths, relative finger lengths) in the two finger characteristics samples are compared. If a number of corresponding finger characteristics in the two finger characteristics satisfies (e.g., is equal to and/or greater than) a threshold value then the two finger characteristics samples match; otherwise, the two finger characteristics samples do not match. The number of corresponding finger characteristics in the two finger characteristics samples can be, for example, a number of corresponding locations in the two finger characteristics samples where minutiae are located, a number of finger widths or lengths, and so forth. In another embodiment, rather than relying on whether the number of corresponding finger characteristics in the two finger characteristics satisfies a threshold value, various public and/or proprietary pattern matching techniques can be used to compare patterns in the two finger characteristics samples (e.g., patterns of minutiae) and determine whether the two finger characteristics samples match.

It should be noted that user authentication can be performed by the device 102 for its own use and/or used by another system or device. For example, the user authentication module 114 can authenticate a user in order to allow the user to access the device 102 itself, programs or applications running on the device 102, other modules or components of the device 102, and so forth. Alternatively, the module 114 can authenticate a user in order to allow the user to access another system or device coupled to the device 102, another system or device accessed by the device 102 via the Internet or other network, and so forth.

It should also be noted that one or more layers of the multi-layer sensing component 104 can operate in different resolution modes as discussed above, and that different resolution modes of such a layer may be able to sense different details regarding an object and thus provide different amounts of fingerprint data. For example, the high resolution sensing component 204 of FIG. 2 may operate in a high resolution mode or a medium resolution mode, and may provide fingerprint data to the fingerprint characteristics sensing module 112 in both of these modes. However, a larger amount of fingerprint data may be provided to the fingerprint characteristics sensing module 112 when the high resolution sensing component 204 is operating in the high resolution mode than in the medium resolution mode. The amount of fingerprint data provided to the fingerprint characteristics sensing module 112 can affect whether the user authentication module 114 can authenticate a user and/or the accuracy of the authentication. Generally, larger amounts of fingerprint data lead to increased ability to authenticate a user and increased accuracy of the authentication.

Figure 3:
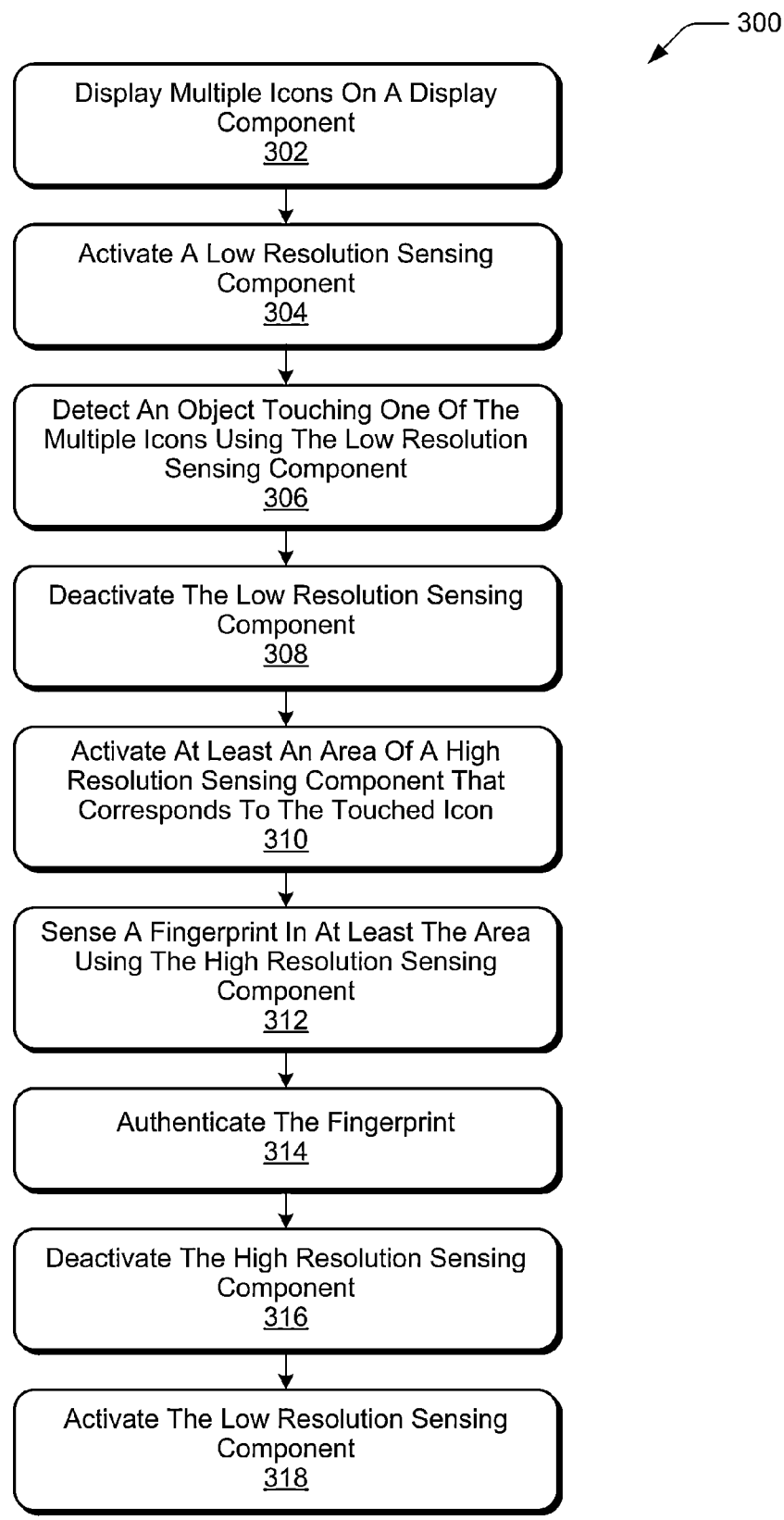
FIG. 3 illustrates an example process implementing the multi-layered sensing with multiple resolutions in accordance with one or more embodiments.

FIG. 3 illustrates an example process 300 implementing the multi-layered sensing with multiple resolutions in accordance with one or more embodiments. Process 300 is implemented by one or more devices, such as by the device 102 of FIG. 1. Process 300 can be implemented in software, firmware, hardware, or combinations thereof. Process 300 is shown as a set of acts and is not limited to the order shown for performing the operations of the various acts. Process 300 is an example of implementing the multi-layered sensing with multiple resolutions; additional discussions of implementing the multi-layered sensing with multiple resolutions are included herein with reference to different FIGs.

Figure 6:
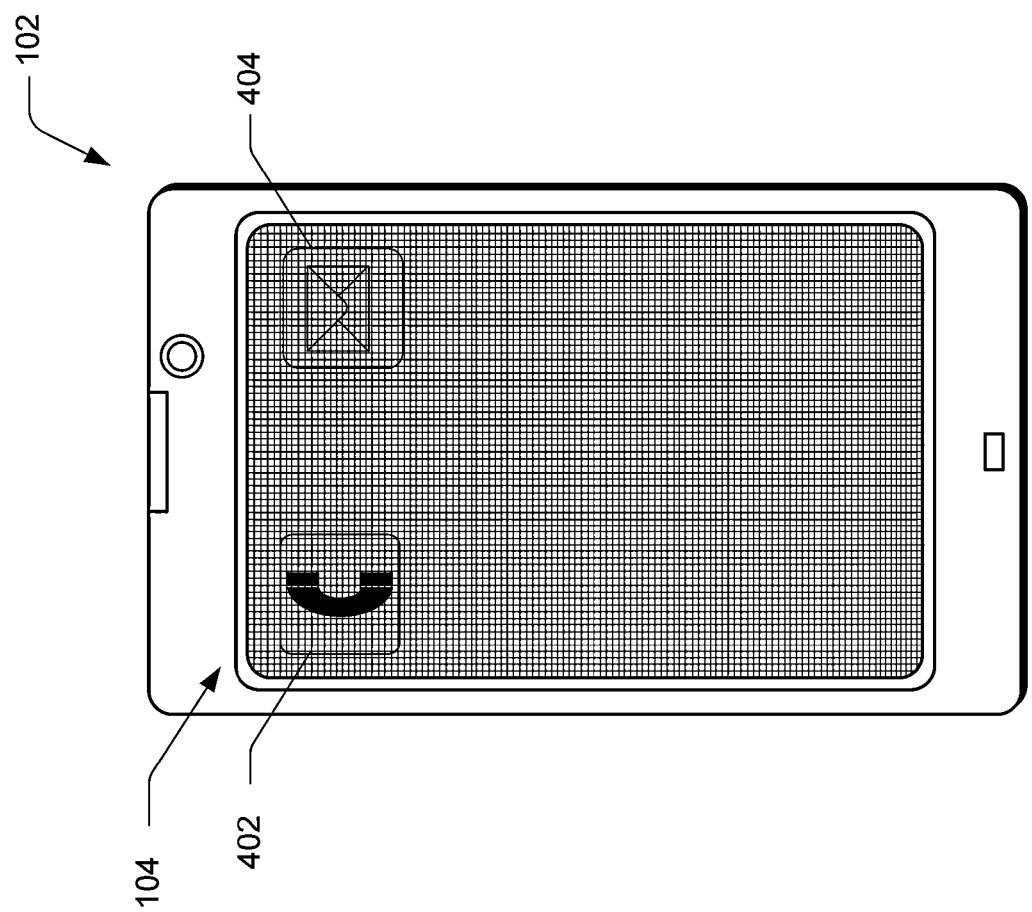

Process 300 is discussed with reference to FIGS. 4-6, which illustrate examples of devices 102 implementing the multi-layered sensing with multiple resolutions discussed herein. The examples in FIGS. 4-6 illustrate a sensing component 104 overlaying a display component 108, the sensing component 104 being illustrated as a sensing grid of column lines and row lines. Although illustrated as a grid overlaying a display component in the examples of FIGS. 4-6, the sensing component 104 can alternatively be implemented in other manners as discussed above. Additionally, although the grid is illustrated in FIGS. 4-6, it should be noted that the grid may not be (but alternatively can be) visible to the user of the device 102. The sensing component 104 operates as a conventional touchscreen (e.g., allowing selection of icons and other interaction with the displayed user interface) as well as a fingerprint sensor.

In process 300, multiple icons are displayed on a display component (act 302). These multiple icons can represent various functionality as discussed above. For example, the device 102 of FIG. 4 displays an icon 402 and an icon 404. The icon 402 includes a telephone handset, and represents telephone functionality of the device 102. The icon 404 includes an envelope, and represents electronic mail and/or messaging functionality of the device 102. It should be noted that the icons 402 and 404 are examples, and that various other icons representing various other functionality can alternatively and/or additionally be displayed by the device 102. The functionality represented by displayed icons can be implemented by the device 102 in software, firmware, hardware, or combinations thereof.

Returning to FIG. 3, a low resolution sensing component is activated (act 304). The low resolution sensing component, such as the low resolution sensing component 202 of FIG. 2, can sense a relatively small number of dots per inch. In the example device 102 of FIG. 4, the low resolution sensing component is activated, illustrated by a low density of column and row grid lines. The resolution of the low resolution sensing component is sufficient to sense an object touching one of the icons 402 and 404, as well as sense which of the icons 402 and 404 is touched. As only one of the low resolution sensing component and the high resolution sensing component is active at a time, the high resolution sensing component is inactive in act 304.

An object touching one of the multiple icons is detected by the low resolution sensing component (act 306). The display component displays an icon in a particular portion of the display component as discussed above. An object touching an icon refers to an object touching part of a top layer of the touch display structure (e.g., touching the top 212 of the cover layer 208 of FIG. 2) that corresponds to (is situated over) the icon.

Various actions can be taken in response to detecting an object touching an icon. For functionality associated with some icons, user authentication is to be performed. If user authentication is to be performed, the low resolution sensing component is deactivated and the high resolution sensing component is activated. Different functionality can use different user authentication levels (e.g., a particular accuracy of the authentication that is to be achieved), and thus different resolutions of the high resolution sensing component can be used to achieve the appropriate accuracy of the authentication.

Thus, in response to detecting an object touching an icon, the sensing component control module 106 of FIG. 1 can change which of the high resolution sensing component and the low resolution sensing component is activated. The sensing component control module 106 can also optionally determine which areas of the high resolution sensing component are activated, as discussed in more detail below.

In one embodiment, the sensing component control module 106 can also change the resolution mode that the high resolution sensing component is operating in. The resolution mode that the high resolution sensing component is to operate in can be determined by the sensing component control module 106 in different manners. For example, an icon can include (e.g., in data describing the icon or metadata) a security setting that indicates a resolution mode to use for the icon (a resolution mode to be activated in order to sense fingerprint data to authenticate the user to use the functionality represented by the icon). This indication can take various forms, such as specifying a particular resolution mode (e.g., high resolution or medium resolution), specifying a particular numeric value (e.g., a particular number of dots per inch the resolution mode is to support), and so forth. Alternatively, the resolution mode can be determined in other manners, such as by the sensing component control module 106 of FIG. 1. For example, the high resolution mode of the sensing component may automatically be activated in response to any icon being touched, or any of a particular subset of icons being touched (e.g., any icons corresponding to functionality for which user authentication is to be performed).

An accuracy of user authentication, and thus the resolution mode to activate in response to detecting an object touching an icon, can be defined in various manners. In one embodiment, an application providing the functionality represented by the icon specifies the resolution mode that is to be activated in response to detecting an object touching the icon. This specified resolution mode can optionally be changed by various other components or entities, such as a user of the device 102, contacts of the device, an administrator managing the device 102, a remote service with which the device 102 communicates (e.g., a banking service that a banking application communicates with), and so forth.

It should be noted that some functionality may use no user authentication. In response to detecting an object touching an icon representing such functionality, the low resolution sensing component need not be deactivated and the high resolution sensing component need not be activated. For example, assume that the telephone functionality represented by the icon 402 of FIG. 4 can be used without user authentication. In response to an object touching the icon 402, the low resolution sensing component remains active.

However, in response to detecting an object touching an icon representing functionality that does desire user authentication, the low resolution sensing component is deactivated (act 308), and at least an area of the high resolution sensing component that corresponds to the touched icon is activated (act 310). The high resolution sensing component can optionally be activated to operate in one of multiple different resolution modes, and the particular mode that the high resolution sensing component is activated to operate in act 310 can be determined in different manners as discussed above.

In one embodiment, the area of the high resolution sensing component that is activated is a portion of the high resolution sensing component that corresponds to the touched icon, and other portions of the high resolution sensing component (portions that are beyond the portion that corresponds to the touched icon) are inactive. The portion of the high resolution sensing component that corresponds to the touched icon is the portion of the high resolution sensing component that is approximately over (e.g., over or close to being over) the touched icon. The portion of the sensing component that is over a touched icon refers to the grid lines that pass over the touched icon, or other dots or points that pass over or are otherwise situated over the touched icon. The portion of the sensing component that is close to being over the touched icons refers to the grid lines that are within a threshold distance of passing over the touched icon, or other dots or points that pass over or are otherwise situated within a threshold distance of being over the touched icon. Although referred to herein as a portion being over or close to being over a touched icon, in situations in which the sensing component is implemented in a layer below the display component, the portion of the sensing component can analogously be below (or close to being below) the touched icon.

For example, assume that the electronic mail and/or messaging functionality represented by the icon 404 of FIG. 4 uses user authentication. In response to an object touching the icon 404, the area of the high resolution sensing component that corresponds to the icon 404 is activated as illustrated by the device 102 of FIG. 5. The area of the high resolution sensing component that is activated is the portion of the multi-layer sensing component 104 including the column lines 502 and the row lines 504 of a sensing grid passing over (or close to passing over) the icon 404. The area of the high resolution sensing component that is activated is illustrated by a high density of column lines 502 and row lines 504; other areas of the high resolution sensing component are not activated.

The column lines 502 and row lines 504 include drive lines and sense lines. Depending on the manner in which the high resolution sensing component is implemented, power may be consumed by drive lines being driven and sense lines being sensed. If power is consumed by both drive lines being driven and sense lines being sensed, then the drive lines that pass over or are close to passing over the touched icon are driven and circuitry to sense current on the sense lines that pass over or are close to passing over the touched icon is powered. Other drive lines are deactivated and circuitry for sensing other sense lines is deactivated. However, if power is consumed by drive lines being driven but not sense lines being sensed (or there is very little or no change in power consumed based on which sense lines are being sensed), then the drive lines that pass over or are close to passing over the touched icon are driven (but other drive lines are deactivated), and no circuitry to sense current on any of the sense lines need be deactivated.

In another embodiment, rather than activating just an area of the high resolution sensing component that corresponds to the touched icon, substantially all of the high resolution sensing component is activated. Although some portions of the sensing component may not be activated in the higher resolution mode (e.g., portions around the edges of the sensing component), all or at least almost all of the high resolution sensing component is activated. For example, assume that the electronic mail and/or messaging functionality represented by the icon 404 of FIG. 4 uses user authentication. In response to an object touching the icon 404, the high resolution sensing component is activated as illustrated by the device 102 of FIG. 6. Substantially all of the high resolution sensing component is activated in the higher resolution mode, which in the example of FIG. 6 is illustrated by a high density of column and row grid lines.

Returning to FIG. 3, a fingerprint is sensed by the high resolution sensing component in at least the area that corresponds to the touched icon (act 312). The fingerprint is sensed by the fingerprint characteristics sensing module 112 of FIG. 1 identifying, based on the sensed fingerprint data, various finger characteristics of one or more of the user's fingers sensed by the high resolution sensing component as discussed above.

The sensed fingerprint is authenticated (act 314). The sensed fingerprint is authenticated by the user authentication module 114 of FIG. 1 analyzing the finger characteristics identified in act 312 and comparing the identified characteristics to one or more stored finger characteristic samples maintained as part of the authentication data 118 as discussed above. The authentication in act 314 can result in a successful authentication (e.g., and the user is permitted access to the functionality represented by the icon) or an unsuccessful authentication (e.g., and the user is denied access to the functionality represented by the icon).

If the user's fingerprint is successfully authenticated, an indication of the identity of the user (e.g., as associated with the finger characteristic samples used to authenticate the user's fingerprint) can be provided to an application or other functionality represented by the touched icon. The application or other functionality represented by the touched icon is thus able to run with the identity of the user. The identity of the user can be used by the application or other functionality in various manners, such as to access data associated with the user, enter into transactions for the user, and so forth.

The high resolution sensing component is also deactivated (act 316) and the low resolution sensing component is again activated (act 318). The high resolution sensing component can be deactivated and the low resolution sensing component reactivated in response to the user fingerprint being successfully authenticated. Alternatively, the high resolution sensing component can be deactivated and the low resolution sensing component activated at other times or in response to other events, such as after a threshold amount of time elapses without the user authentication module 114 being able to successfully authenticate the fingerprint, in response to the user authentication module 114 indicating that the module 114 cannot successfully authenticate the fingerprint, in response to the icon no longer being touched (e.g., keeping the area of the high resolution sensing component activated only so long as the object is touching the icon), and so forth.

Thus, the low resolution sensing component of the multi-layer sensing component is activated and operates until an object touches one of the displayed icons, and in response to the touch the low resolution sensing component can be deactivated and the high resolution sensing component activated. After a fingerprint is authenticated, the high resolution sensing component can be deactivated and the low resolution sensing component re-activated. The device 102 thus does not expend power to run the high resolution sensing component, except for when used to sense fingerprints.

It should be noted that in the examples of FIGS. 4-6, the icons 402 and 404 are illustrated as being displayed in particular locations on the display component. These different locations are examples, and the icons 402 and 404 can be displayed anywhere on the display component and can be moved to different locations on the display component by the user (e.g., by dragging and dropping an icon). The sensing component control module 106 of FIG. 1 can be aware of the locations of the icons (e.g., via communication with the display control module 110). Thus, if an icon is moved to a new location on the display component and is touched at that new location, the sensing component control module 106 can activate an appropriate area of the high resolution sensing component that corresponds to the touched icon at its new location.

In the embodiments discussed herein, the high resolution sensing component can have a large number (e.g., thousands) of drive lines, such as in a sensing grid. In one embodiment, a driver component driving these drive lines is able to concurrently drive the number of lines dictated by the high resolution sensing component used by the device 102. In this embodiment, the driver component drives the appropriate lines based on which areas of the high resolution sensing component are to be activated as discussed above.

In another embodiment, the driver component does not concurrently drive the number of lines dictated by the sensing component resolutions used by the device 102. In this embodiment, the driving of drive lines is time division multiplexed, resulting in different portions of the high resolution sensing component being driven or activated at different times.

Figure 7:
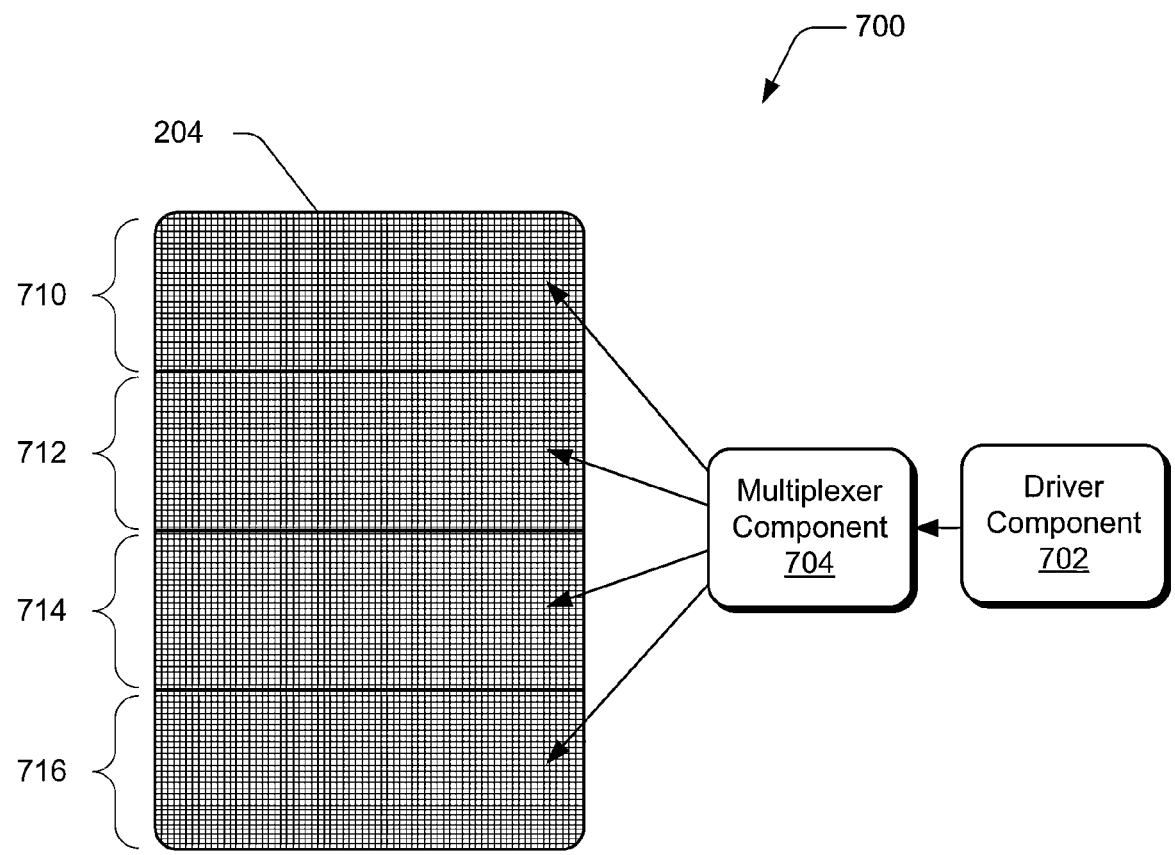
FIGS. 7 and 8 illustrate examples of systems multiplexing drive lines in accordance with one or more embodiments.

FIG. 7 illustrates an example system 700 multiplexing drive lines in accordance with one or more embodiments. The system 700 includes a driver component 702, a multiplexer component 704, and the high resolution sensing component 204. The high resolution sensing component 204 is a sensing grid with rows of drive lines. The high resolution sensing component 204 is separated into four parts 710, 712, 714, and 716, with the rows of drive lines of the high resolution sensing component 204 being grouped into one of the four parts. The driver component 702 provides signals to drive the drive lines of the high resolution sensing component 204, and the multiplexer component 704 multiplexes those signals to the different parts 710-716, providing the signals to different ones of parts 710-716 at different times. Thus, different parts of the high resolution sensing component 204 are activated at different times. For example, the multiplexer component 704 provides the signals to part 710 for an amount of time, then to part 712 for an amount of time, then to part 714 for an amount of time, then to part 716 for an amount of time, then to part 710 for an amount of time, and so forth. The multiplexer component 704 multiplexes the signals quickly enough so that user inputs (e.g., touches) can be provided to the high resolution sensing component 204 and responded to with little if any delay in response that is noticeable to a user of the device 102. For example, the multiplexer component 704 can multiplex the signals so that each of parts 710-716 receives the signals for approximately 25 milliseconds every 100 milliseconds. However, it should be noted that these values are an example, and other values can alternatively be used.

Figure 8:
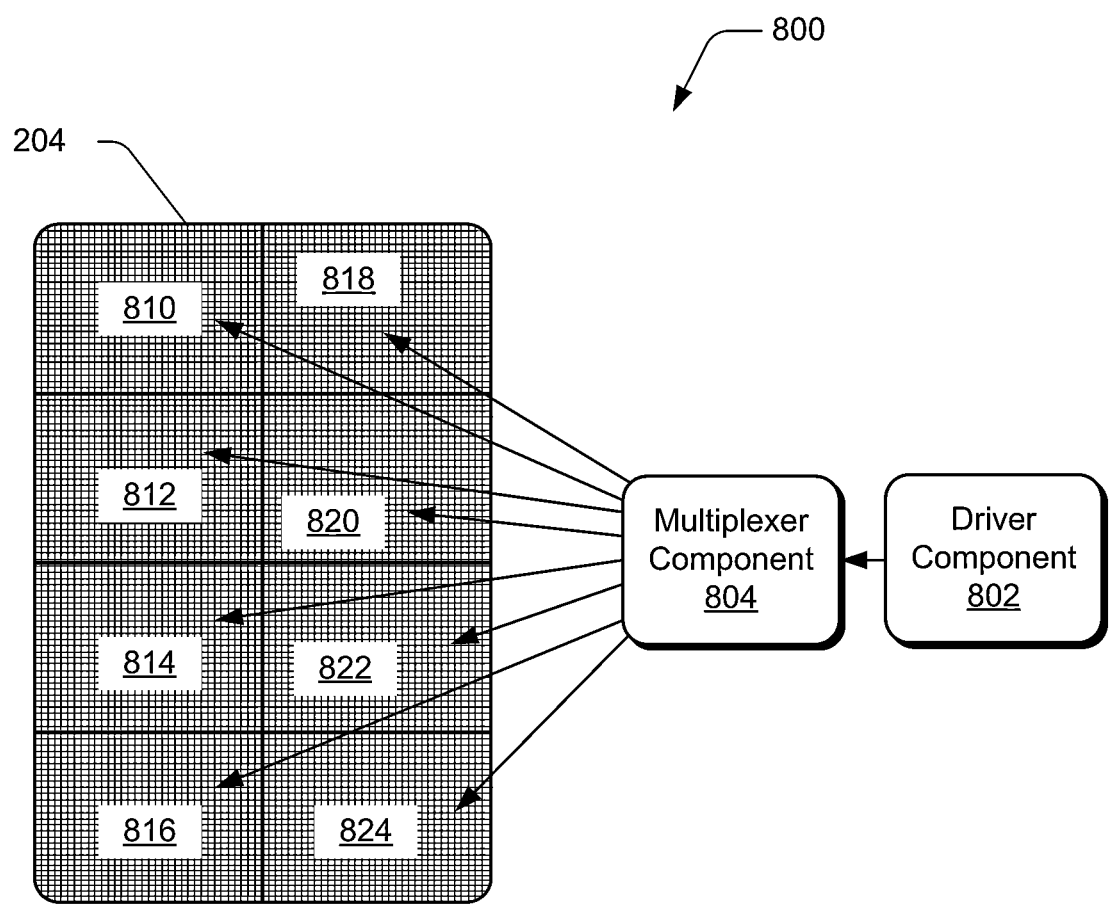

FIG. 8 illustrates an example system 800 multiplexing drive lines in accordance with one or more embodiments. The system 800 includes a driver component 802, a multiplexer component 804, and the high resolution sensing component 204. The high resolution sensing component 204 is a sensing grid with rows of drive lines. The high resolution sensing component 204 is separated into eight parts 810, 812, 814, 816, 818, 820, 822, and 824, with the rows of drive lines of the high resolution sensing component 204 being grouped into one of the eight parts. The driver component 802 provides signals to drive the drive lines of the high resolution sensing component 204, and the multiplexer component 804 multiplexes those signals to the different parts 810-824, providing the signals to different ones of parts 810-824 at different times. Thus, different parts of the high resolution sensing component 204 are activated at different times. For example, the multiplexer component 804 provides the signals to part 810 for an amount of time, then to part 812 for an amount of time, then to part 814 for an amount of time, then to part 816 for an amount of time, then to part 818 for an amount of time, then to part 820 for an amount of time, then to part 822 for an amount of time, then to part 824 for an amount of time, then to part 810 for an amount of time, and so forth. The multiplexer component 804 multiplexes the signals quickly enough so that user inputs can be provided to the high resolution sensing component 204 and responded to with little if any delay in response that is noticeable to a user of the device 102. For example, the multiplexer component 804 can multiplex the signals so that each of parts 810-824 receives the signals for approximately 12.5 milliseconds every 100 milliseconds. However, it should be noted that these values are an example, and other values can alternatively be used.

Despite the multiplexing of drive lines illustrated in the systems 700 and 800, the driver components 702 and 802 still drive the number of lines dictated by the sensing component resolutions used by the device 102. Drive lines for the appropriate areas of the high resolution sensing component 204 are activated at the appropriate times as discussed above. Any of various components (such as the driver component 702 or 802) can readily determine, based on which areas of the high resolution sensing component 204 are to be activated at any given time as well as the manner in which the signals from the driver component 702 or 802 are multiplexed by the multiplexor component 704 or 804, which signals to drive at which times so that the appropriate drive lines of the high resolution sensing component are driven at the appropriate times.

Additionally, as discussed above one of the high resolution sensing component 204 and the low resolution sensing component 202 is activated at a time. In one embodiment, separate driver components are associated with each of the components 204 and 202, one driver component driving drive lines of the high resolution sensing component 204 when the component 204 is activated, and the other driver component driving the drive lines of the low resolution sensing component 202 when the component 202 is activated.

Figure 9:
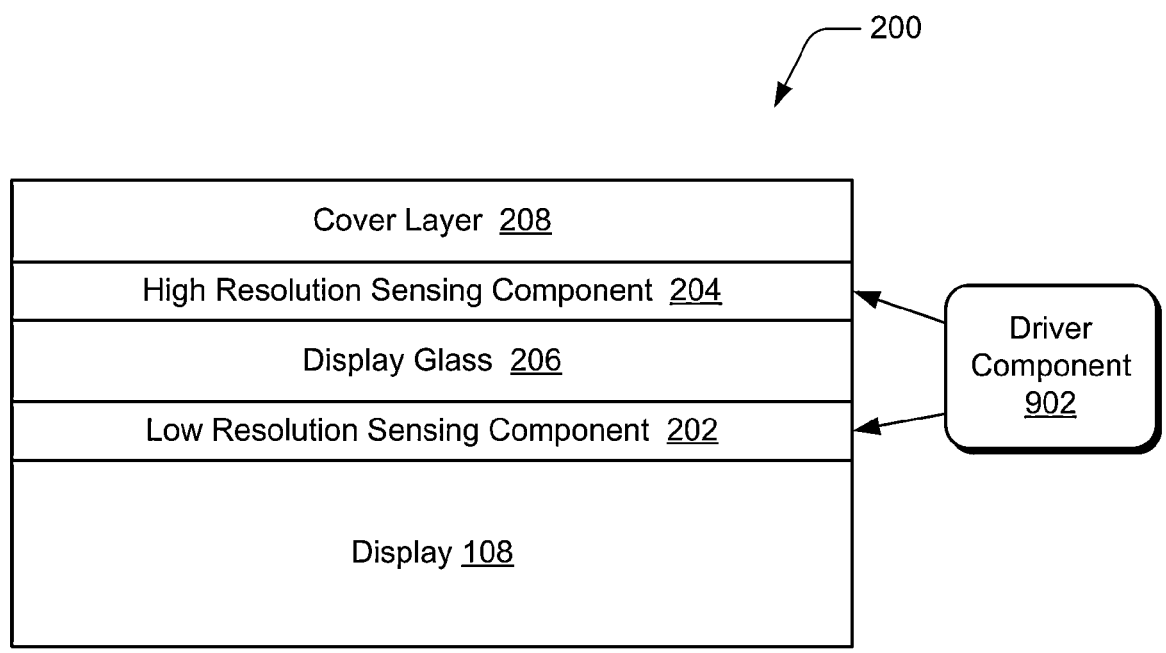
FIG. 9 illustrates an example touch display structure having sensing components driven by the same driver component in accordance with one or more embodiments.

In another embodiment, one driver component drives both the high resolution sensing component 204 and the low resolution sensing component 202. FIG. 9 illustrates an example touch display structure 200 having sensing components driven by the same driver component in accordance with one or more embodiments. The driving of drive lines for the high resolution sensing component 204 and the low resolution sensing component 202 is time division multiplexed, resulting in different ones of the components 202 and 204 being driven at different times. The one of the components 202 and 204 having its drive lines driven at any given time is the one of the components 202 and 204 that is active at that given time.

In the discussions above, reference is made to sensing a fingerprint while a finger is touching an icon. It should be noted that situations can arise where fingerprint data for multiple fingers is sensed by the multi-layer sensing component 104. Such situations can arise in various manners, such as after an initial user authentication is performed (e.g., in response to a user touching an icon) for functionality that desires further authentication in the form of additional fingerprints. When sensing multiple fingerprints, the multi-layer sensing component 104 can sense the fingerprint data for the multiple fingerprints serially or in a serial mode (e.g., one fingerprint after the other), or alternatively in parallel or in a parallel mode (e.g., the multiple fingerprints concurrently). The areas of the multi-layer sensing component 104 that the multiple fingers are touching can be sensed by the low resolution sensing component 202, and at least the corresponding areas (e.g., portions of the high resolution sensing component that are approximately over the touched area, analogous to portions of the high resolution sensing component being approximately over a touched icon discussed above) of the high resolution sensing component 204 can be activated to sense the fingerprints. Alternatively, an indication can be provided to the user to place his or her fingers on a particular portion of the touch display structure 200 corresponding to an area of the high resolution sensing component 204 that can be activated to sense fingerprints, or substantially all of the high resolution sensing component can be activated.

Thus, using the techniques discussed herein, the user is authenticated on demand, as he or she uses the device 102. No separate authentication screen need be displayed to the user, and no separate fingerprint sensor need be used. Rather, by simply touching the icon that represents the functionality the user desires to invoke and for which user authentication is used, the user's fingerprint is authenticated. The multi-layer sensing component has high and low resolution sensing components, conserving power by not keeping the high resolution sensing component always running.

The techniques discussed herein support various usage scenarios. For example, a user's device can support different functionality (e.g., run multiple applications) that use different authentication accuracies. By simply touching an icon with his or her finger to run the application represented by the icon, the user's fingerprint is automatically authenticated using the appropriate authentication accuracy for the application represented by the icon. By way of another example, the device includes a high resolution sensing component to authenticate fingerprints, but can use low sensing component resolutions at other times. Thus, the user's fingerprint can be authenticated by activating the high resolution sensing component, but the device can conserve power by activating the low resolution sensing component after the user's fingerprint has been sensed.

Figure 10:
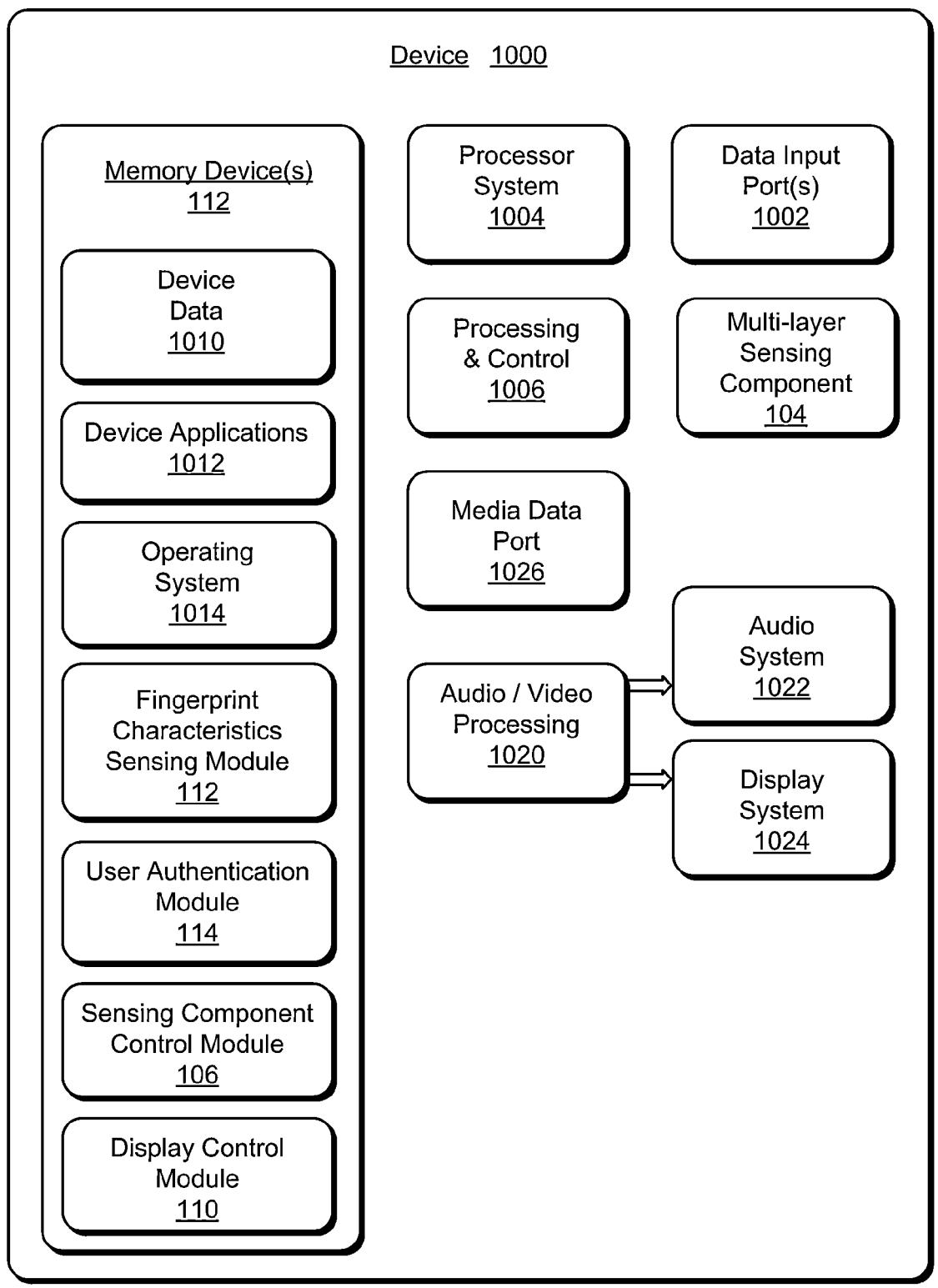
FIG. 10 illustrates various components of an example electronic device that can implement embodiments of the multi-layered sensing with multiple resolutions.

FIG. 10 illustrates various components of an example electronic device 1000 that can be implemented as a device as described with reference to any of the previous FIGS. 1-9. The device may be implemented as any one or combination of a fixed or mobile device, in any form of a consumer, computer, portable, user, wearable, communication, phone, navigation, gaming, messaging, Web browsing, paging, media playback, and/or other type of electronic device, such as the device 102.

The electronic device 1000 can include one or more data input ports 1002 via which any type of data, media content, and/or inputs can be received, such as user-selectable inputs, messages, music, television content, recorded video content, and any other type of audio, video, and/or image data received from any content and/or data source. The data input ports 1002 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

The electronic device 1000 of this example includes a processor system 1004 (e.g., any of microprocessors, controllers, and the like), or a processor and memory system (e.g., implemented in an SoC), which process computer-executable instructions to control operation of the device. A processing system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 1006. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 1000 also includes one or more memory devices 116 that enable data storage, examples of which include random access memory (RAM), non-volatile memory (e.g., read-only memory (ROM), flash memory, EPROM, EEPROM, etc.), and a disk storage device. A memory device 116 provides data storage mechanisms to store the device data 1010, other types of information and/or data, and various device applications 1012 (e.g., software applications). For example, an operating system 1014 can be maintained as software instructions with a memory device and executed by the processor system 1004.

In embodiments, the electronic device 1000 includes a fingerprint characteristics sensing module 112, a user authentication module 114, a sensing component control module 106, and a display control module 110 as described above. Although represented as a software implementation, each of the module 106, the module 110, the module 112, and the module 114 may be implemented as any form of a control application, software application, signal-processing and control module, firmware that is installed on the device, a hardware implementation of the controller, and so on. The electronic device 1000 also includes a multi-layer sensing component 104 as described above.

The electronic device 1000 can also include an audio and/or video processing system 1020 that processes audio data and/or passes through the audio and video data to an audio system 1022 and/or to a display system 1024. The audio system and/or the display system may include any devices that process, display, and/or otherwise render audio, video, display, and/or image data, including the display component 108 discussed above. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1026. In implementations, the audio system and/or the display system are external components to the electronic device. Alternatively or in addition, the display system can be an integrated component of the example electronic device, such as part of an integrated touch interface.

Although embodiments of multi-layered sensing with multiple resolutions have been described in language specific to features and/or methods, the subject of the appended claims is not necessarily limited to the specific features or methods described. Rather, the specific features and methods are disclosed as example implementations of multi-layered sensing with multiple resolutions.

The invention claimed is:

1. A method comprising:
   displaying, by a device, multiple icons at a display structure of the device,
   wherein the display structure comprises:
      a display screen for displaying the multiple icons;
      a low resolution sensor situated above the display screen for detecting touches;
      a separation layer situated above the low resolution sensor;
      a high resolution sensor situated above the separation layer for detecting fingerprints; and
      a protective layer situated above the high resolution sensor;
   activating, by the device, the low resolution sensor of the display structure for detecting touches at the protective layer;
   detecting, by the device, using the low resolution sensor, an object touching a location of the display structure at which one of the multiple icons is displayed; and
   responsive to detecting the object touching the location of the display structure at which the one of the multiple icons is displayed:
      deactivating, by the device, the low resolution sensor; and
      activating, by the device, at least one area of the high resolution sensor of the display structure for detecting fingerprints, the at least one area corresponding to the location of the display structure at which the one of the multiple icons is displayed.

2. The method of claim 1, further comprising determining, by the device, using the low resolution sensor, the at least one area of the high resolution sensor.

3. The method of claim 1, further comprising:
   sensing, by the device, using the high resolution sensor, a fingerprint in at least the at least one area;
   authenticating, by the device, the fingerprint; and
   responsive to authenticating the fingerprint:
      deactivating, by the device, the high resolution sensor; and
      activating, by the device, the low resolution sensor.

4. The method of claim 3, further comprising enabling, by the device, an application associated with the one icon of the multiple icons to execute based on an identity of a user associated with the fingerprint.

5. The method of claim 1, wherein activating the at least one area of the high resolution sensor comprises activating a portion of the high resolution sensor that overlaps the location at which the one of the multiple icons is displayed or is at least within a threshold distance of the location.

6. The method of claim 1, wherein the high resolution sensor comprises a sensing grid, and activating the at least one area of the high resolution sensor comprises activating one or more drive lines and sense lines of the sensing grid located at the location at which the one of the multiple icons is displayed or that are at least within a threshold distance of the location.

7. The method of claim 1, wherein the location is a first location, the method further comprising:
   deactivating, by the device, the high resolution sensor;
   activating, by the device, the low resolution sensor;
   detecting, by the device, using the low resolution sensor, an object touching a second location of the display structure at which an additional one of the multiple icons is displayed; and
   while the object detecting the object touching the additional one of the multiple icons keeping, by the device, the low resolution sensor activated and the high resolution sensor deactivated.

8. The method of claim 1, wherein activating the at least one area of the high resolution sensor comprises activating the at least one area of the high resolution sensor in a medium resolution mode that is less than a full resolution of the high resolution sensor.

9. A device comprising:
   a display controller configured to display multiple icons at an external display structure, wherein the external display structure comprises:
      a display screen for displaying the multiple icons;
      a low resolution sensor situated above the display screen and configured to detect an object touching a location of the external display structure at which one of the multiple icons is displayed;
      a separation layer situated above the low resolution sensor;
      a high resolution sensor situated above the separation layer and configured to sense a fingerprint in at least one area corresponding to the location of the external display structure at which the one of the multiple icons is displayed; and
      a protective layer situated above the high resolution sensor,
   wherein the display controller is further configured to activate the low resolution sensor of the external display structure for detecting the object touching the location of the external display structure by at least detecting touches at the protective layer.

10. The device of claim 9, wherein the display controller is further configured to:
   deactivate the low resolution sensor while the high resolution sensor is activated for sensing the fingerprint, and
   reactivate the low resolution sensor after the high resolution sensor senses the fingerprint.

11. The device of claim 9, wherein the display controller is further configured to deactivate portions of the high resolution sensor other than the at least one area.

12. The device of claim 9, the high resolution sensor comprising a sensing grid, and the at least one area comprising one or more drive lines and sense lines of the sensing grid located at the location of the external display structure at which the one of the multiple icons is displayed or that are at least within a threshold distance of the location.

13. A device comprising:
   a display structure comprising:
      a display screen for displaying multiple icons;
      a low resolution sensor situated above the display screen for detecting touches;

a separation layer situated above the low resolution sensor;

a high resolution sensor situated above the separation layer for detecting fingerprints; and a protective layer situated above the high resolution sensor;

a display controller configured to display the multiple icons at the display screen; and a sensor controller configured to: activate the low resolution sensor for detecting touches at the protective layer;

detect, using the low resolution sensor, an object touching a location of the display structure at which one of the multiple icons is displayed; and responsive to the low resolution sensor detecting the object touching the location of the display structure at which the one of the multiple icons is displayed:

deactivate the low resolution sensor; and activate at least one area of the high resolution sensor for detecting fingerprints, the at least one area corresponding to the location of the display structure at which the one of the multiple icons is being displayed.

14. The device of claim 13, the sensor controller being further configured to determine, using the low resolution sensor, the at least one area of the high resolution sensor.

15. The device of claim 13, the sensor controller being further configured to:

determine, using the low resolution sensor, multiple additional areas of the high resolution sensor that correspond to multiple additional locations of the display structure at which the low resolution sensor detects concurrent touches; and activate the multiple additional areas of the high resolution sensor.

16. The device of claim 13, further comprising a driver and a multiplexer configured to activate different parts of the high resolution sensor at different times.

17. The device of claim 13, further comprising a driver configured to activate the high resolution sensor and the low resolution sensor at different times.

18. The device of claim 13, wherein the sensor controller is further configured to activate the at least one area of the high resolution sensor by at least activating a portion of the high resolution sensor that overlaps the location of the display structure at which the one of the multiple icons is displayed or is at least within a threshold distance of the location.

19. The device of claim 13, the high resolution sensor comprising a sensing grid, and wherein the sensor controller is configured to activate the at least one area of the high resolution sensor by at least activating one or more drive lines and sense lines of the sensing grid located at the location of the display structure at which the one of the multiple icons is displayed or that are at least within a threshold distance of the location.

* * * * *